United States Patent
Kim et al.

(10) Patent No.: US 8,365,277 B2
(45) Date of Patent: Jan. 29, 2013

(54) SIGNATURE STRING STORAGE MEMORY OPTIMIZING METHOD, SIGNATURE STRING PATTERN MATCHING METHOD, AND SIGNATURE STRING MATCHING ENGINE

(75) Inventors: Byoung Koo Kim, Daejeon (KR); Jin Tae Oh, Daejeon (KR); Jong Soo Jang, Daejeon (KR); Sung Won Sohn, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 1081 days.

(21) Appl. No.: 12/331,613

(22) Filed: Dec. 10, 2008

(65) Prior Publication Data
US 2009/0158427 A1  Jun. 18, 2009

(30) Foreign Application Priority Data
Dec. 17, 2007  (KR) ........................ 10-2007-0132806

(51) Int. Cl.
*G06F 11/00* (2006.01)
*G06F 12/14* (2006.01)
*G06F 7/04* (2006.01)
(52) U.S. Cl. .......................................... 726/22; 726/26
(58) Field of Classification Search ................ 726/22, 726/26
See application file for complete search history.

(56) References Cited

U.S. PATENT DOCUMENTS

| 5,359,724 A * | 10/1994 | Earle ...................................... 1/1 |
| 6,609,205 B1 * | 8/2003 | Bernhard et al. ................ 726/22 |
| 7,110,540 B2 * | 9/2006 | Rajagopal et al. .............. 380/44 |
| 7,370,202 B2 * | 5/2008 | Appenzeller et al. ......... 713/171 |
| 2005/0125551 A1 * | 6/2005 | Oh et al. ........................ 709/230 |
| 2006/0184556 A1 * | 8/2006 | Tan et al. ....................... 707/101 |
| 2009/0158427 A1 * | 6/2009 | Kim et al. ........................ 726/22 |
| 2009/0177886 A1 * | 7/2009 | Takano et al. ................. 713/168 |

FOREIGN PATENT DOCUMENTS

| KR | 10-0500589 B1 | 7/2005 |
| KR | 10-0531622 B1 | 11/2005 |

OTHER PUBLICATIONS

Young H. Cho, et al; "Specialized Hardware for Deep Network Packet Filtering", FPL 2002, LNCS 2438, pp. 452-461, 2002.

* cited by examiner

*Primary Examiner* — William Powers
(74) *Attorney, Agent, or Firm* — Ladas & Parry LLP

(57) ABSTRACT

Enclosed are a signature string storage memory optimizing method, a signature string pattern matching method, and a signature matching engine. Signature is tokenized in units of substrings and the tokenized substrings are stored in an internal memory block and an external memory block to optimize a memory storage pattern. Therefore, matching of introduction data to signature patterns is effectively performed.

14 Claims, 6 Drawing Sheets

SIGNATURE STRING STORAGE MEMORY OPTIMIZING METHOD, SIGNATURE STRING PATTERN MATCHING METHOD, AND SIGNATURE STRING MATCHING ENGINE

This application claims the benefit of Korean Application No. 10-2007-0132806, filed on Dec. 17, 2007 in the Korean Intellectual Property Office, the disclosure of which is incorporated herein by reference.

CROSS-REFERENCE TO RELATED APPLICATION

This application claims the benefit of Korean Application No. 10-2007-0132806, field on Dec. 17, 2007 in the Korean Intellectual Property Office, the disclosure of which is incorporated herein by reference.

BACKGROUND OF THE INVENTION

1. Field of the Invention

The present invention relates to a hardware based high performance pattern matching technology for searching a large amount of patterns at high speed, and more particularly, to a high performance pattern matching method using an optimized pattern arranging method capable of applying a larger amount of search patterns to a limited hardware memory.

The present invention was supported by the IT R&D program of Ministry of Information and Communication (MIC) and Institute for Information Technology Advancement (IITA) [Project No.: 2006-S-042-02, Project Title: Development of Signature Generation and Management Technology against Zero-day Attack].

2. Discussion of the Related Art

Various systems have been developed in order to cope with invasion through a network. However, a high speed network such as Gigabit Ethernet and transmission and reception of a large amount of data based on the high speed network request a change in a conventional low speed security analyzing technique.

In order to properly cope with a high speed and large capacity network and with various invasion attempts, a method of analyzing a large amount of data within a short time is required. That is, researches on a new type of security system considering the above are required. However, most of conventional security systems are based on a packet missing ratio and an invasion detecting ratio and have technological limitations on performance.

In order to solve the problem, hardware based pattern matching methods started to be researched and developed to provide a high speed invasion detecting function, a fire wall function, and a virus detecting function. Most of the systems are performed through a method of examining a rule based specific pattern. Therefore, methods whose performance is not deteriorated by the number of applied patterns and the length of string character columns that each pattern has are required. Therefore, a hash based matching method on a hardware chip memory is widely used. However, it is difficult to apply a large number of patterns due to hash collision.

However, since the number of currently known invasion detecting rules is several thousands and the number of string character columns that each of the rules has is between one byte and 100 bytes, it is difficult to apply a large number of rules without deteriorating performance. In addition, unlike a software based system, since a hardware based system accompanies limitations on a memory, a method of effectively applying a large number of harmful traffic patterns is required.

In addition, although limitations on the memory are recovered using an external memory block, it is difficult to prevent performance from deteriorating. Therefore, a method of effectively and maximally arranging the harmful traffic patterns on a limited memory to apply the same without deteriorating performance is required.

SUMMARY OF THE INVENTION

In order to solve the above-described problems, it is an object of the present invention to provide a method of effectively optimizing a pattern memory for performing hardware based high performance pattern matching by dividing searching patterns to be applied into tokens of a proper size and by properly arranging the tokens in memory blocks in a hardware chip and memory blocks outside the hardware chip.

Therefore, it is an object of the present invention to provide a pattern matching method of preventing performance from deteriorating and of recovering limitations on a memory by arranging a large number of searching patterns in a pattern memory optimizing method and by properly applying a hash based internal memory block matching method and a hash based external memory block matching method.

In addition, since a high speed pattern matching method for a large amount of searching patterns according to the present invention is widely used in other fields than a security field, a method that can be easily used in all of the fields that require the present invention is provided.

In order to achieve the above object, there is provided a method of optimizing a signature string storage memory, comprising tokenizing signature string patterns to be used as searching patterns of a harmful packet to substrings, determining whether a substring to be stored in the substrings is the same as a substring of another previously stored signature string pattern to share a corresponding memory table when it is determined that the substring to be stored is the same as the substring of the other previously stored signature string pattern and to analyze whether the substring to be stored is a first substring when it is determined that the substring to be stored is not the same as the substring of the other previously stored signature string pattern, storing the substring in an internal memory block when it is determined that the substring to be stored is the first substring and analyzing whether a memory table in which a substring previous to the substring to be stored is stored is linked to a memory table in which another substring corresponding to a position of the substring to be stored is stored when it is determined that the substring to be stored is not the first substring, and storing the substring in an external memory block when it is determined that the memory table in which the substring previous to the substring to be stored is stored is not linked to the memory table in which another substring corresponding to the position of the substring to be stored is stored and storing the substring in the internal memory block when it is determined that the memory table in which the substring previous to the substring to be stored is stored is linked to the memory table in which another substring corresponding to the position of the substring to be stored is stored.

There is provided a method of matching signature string patterns, comprising dividing a payload of introduction traffic to be the same as a size of a signature substring character column stored in a signature matching engine, calling a memory table of an internal memory block address corresponding to the hash value of the character column to be searched when a character column previous to a character column to be searched in the character columns of the divided introduction traffic was not matched to the stored signature substring, stopping a matching process when the signature substring stored in the called memory table is not matched to the character column to be searched and analyzing whether the matched signature substring is the last substring in the signature substrings when the signature substring stored in the called memory table is matched to the character column to be searched, and analyzing whether the character column to be searched is matched to the substring stored in the called external memory block address when an external memory block address is called from the called memory table when the matched signature substring is not the last substring and generating an alarm when the matched signature substring is the last substring.

There is provided a signature matching engine stored in units of substrings to which signature strings for distinguishing harmful packets included in introduction traffic are tokenized, comprising an internal memory block in which a memory table including the substring to be stored is included is provided when the memory table including the first substring that constitutes the signature in the substrings is linked to the memory table in which another substring corresponding to the substring to be stored in the memory table in which the previous substring is stored and an external memory block in which a memory table including the substring to be stored is provided when the memory table in which the previous substring is stored is linked to the memory table in which the other substring corresponding to the substring to be stored is stored.

DETAILED DESCRIPTION OF THE PREFERRED EMBODIMENTS

Figure 1:
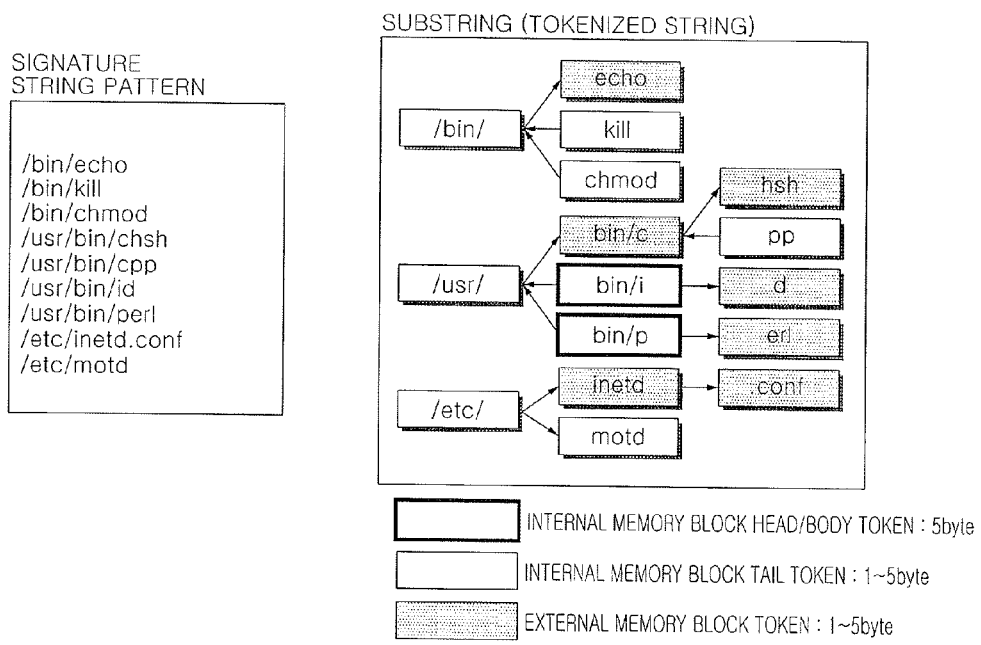
FIG. 1 illustrates a structure in which signature substring is stored in internal memory blocks and external memory blocks in a method of storing a signature string memory according to the present invention.

Hereinafter, embodiments of the present invention will be described with reference to the accompanying drawings.

The advantages, characteristics and method of achieving the same will be clarified with reference to the accompanying drawings and embodiments described as follows in detail. This invention may, however, be embodied in many different forms and should not be construed as being limited to the embodiments set forth herein; rather these embodiments are provided so that this disclosure will be thorough and complete, and will fully convey the concept of the invention to those skilled in the art. The present invention is defined by the scope of the claims. The same reference numerals in different drawings represent the same element.

According to the present invention, a method of matching hardware patterns without deteriorating performance by a method of optimizing a pattern memory based on string tokenizing is provided. In the method, searching patterns to be applied on a hardware memory are divided into tokens of a uniform size and the tokens are properly arranged in internal memory blocks and external memory blocks so that it is possible to apply maximal searching patterns in a minimal memory region. Therefore, according to the present invention, it is possible to effectively use limited hardware memory resources, to maximally store searching patterns, and to search patterns without deteriorating performance. Here, an embodiment of the present invention will be described with reference to the attached drawings.

FIG. 1 illustrates an example of optimizing a pattern memory by a string tokenizing process for signature string patterns to be used as actual searching patterns. First, the signature string patterns are tokenized in units of basic 5 bytes considering the sizes of the limited hardware internal and external memory blocks.

Here, the first 5 bytes of each of the signature string patterns constitute the head tokens of the internal memory blocks and the tokens of the same character column share the same memory space. In the case of a signature string pattern smaller than 5 bytes, the signature string pattern functions as a head token and a tail token. That is, the tail token varies from 1 byte to 5 bytes. Continuously, the external memory blocks are used when the currently arranged token does not indicate the next token.

When a first "/bin/echo" signature string pattern is arranged in a memory, since a next token indicated by a "/bin/" token does not exist, an "echo" token is provided in the external memory blocks and the position of the "echo" token is indicated by the "/bin/" token. Next, when a "/bin/kill" signature string pattern is provided in a memory, since the first "/bin/" token is previously stored as a head token, the corresponding memory region is shared. Since the next token indicated by the corresponding "/bin/" token exists, a "kill" token is provided as the tail token of the internal memory block and has the address information of the previous "/bin/" token. By such a method, tokens are divided into tokens to be arranged in the internal memory blocks and tokens to be arranged in the external memory blocks. A first token is always provided in the internal memory blocks.

Figure 2:
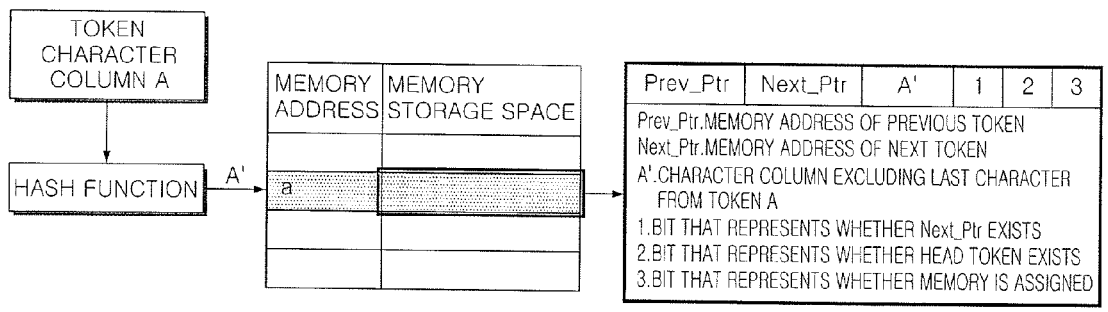
FIGS. 2 to 6 illustrate a method of storing the signature substring in the internal memory blocks and the external memory blocks according to a specific embodiment of the present invention.

FIG. 2 illustrates an example of a method of storing the tokens arranged in the method illustrated in FIG. 1 in an actual internal memory block. First, when a token character column A exists, a memory address a in which information on the corresponding token is to be stored is calculated by performing a hash function corresponding to the token character column A. A simple hash function such as a Shift+Add hash algorithm and a Shift+Xor hash algorithm that can easily perform hardware is used as the hash function. In addition, since the head token is the first of the corresponding pattern, the head token can be realized by a TCAM logic in the internal memory block.

Information on the token to be stored in the corresponding memory address a consists of Prev_Ptr that is the memory address of a previous token, Next_Ptr that is the memory address of a next token, a token character column A' excluding the last character from the token character column A, a first bit the represents whether the Next_Ptr exists, a second bit that represents the head token exists, and a third bit that represents whether the memory is assigned. Here, Prev_Ptr is filled with "null" when a bit that represents whether the head token exists is set and the Next_Ptr has the corresponding external memory block address value when a bit that represents whether the Next_Ptr exists is set. The third bit determines whether the value of the corresponding memory has a meaning when actual pattern matching is performed.

Here, the reason A' is stored is because matching can be performed although the last byte is unknown since access is made to the corresponding memory address by the hash value. The internal memory block includes a plurality of memory blocks and different memory blocks are used in accordance with the sizes of the tokens.

Figure 3:
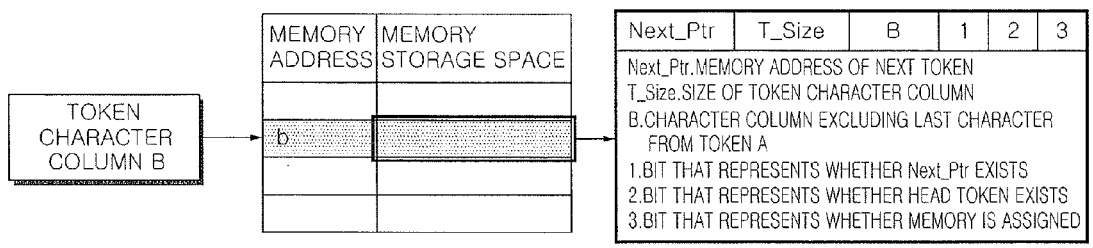

FIG. 3 illustrates an example of a method of storing the tokens arranged in the method of FIG. 1 are stored in an actual external memory block. Unlike in FIG. 2, the tokens stored in the external memory block are sequentially arranged from a 0th memory address. First, when a token character column B exists, information on the corresponding token is stored in a memory address b in the order that is not assigned.

Information on the token to be stored consists of the Next_Ptr that is the memory address of the next token, the size T_Size of the token character column, the corresponding token character column B, the first bit the represents whether the Next_Ptr exists, a second bit that represents a tail token exists, and the third bit that represents whether the memory is assigned. Here, the T_Size is filled with a basic value "5" when a bit that represents whether the tail token exists is not set and the remaining information items have the same meaning as FIG. 2. Finally, the reason why the token character column B is stored as it is because matching is performed by directly accessing the memory address indicated by the internal memory block. In the case of the signature string pattern continuously connected to the Next_Ptr, it is not necessary to perform hash based matching.

In the above-described use of the external memory blocks, unlike the arrangement of the hash based internal memory blocks, since sequential arrangement can be performed, it is possible to maximize the efficiency of the use of the memory. Since the corresponding memory is searched only if necessary in accordance with the matching result of the first token, pattern matching without deteriorating performance is supported. In addition, since a large number of tokens can be arranged in the external memory blocks, it is possible to recover the limitations of the internal memory blocks that hardware has.

Figure 4:
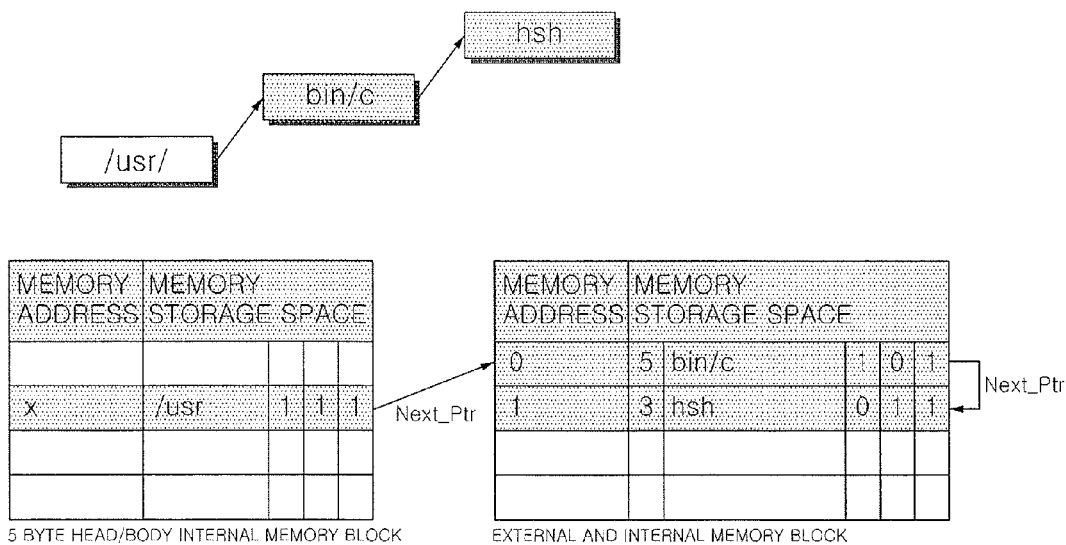
Figure 5:
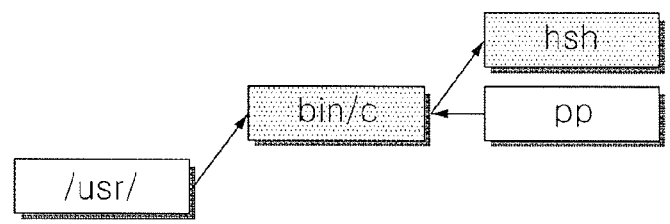
Figure 6:
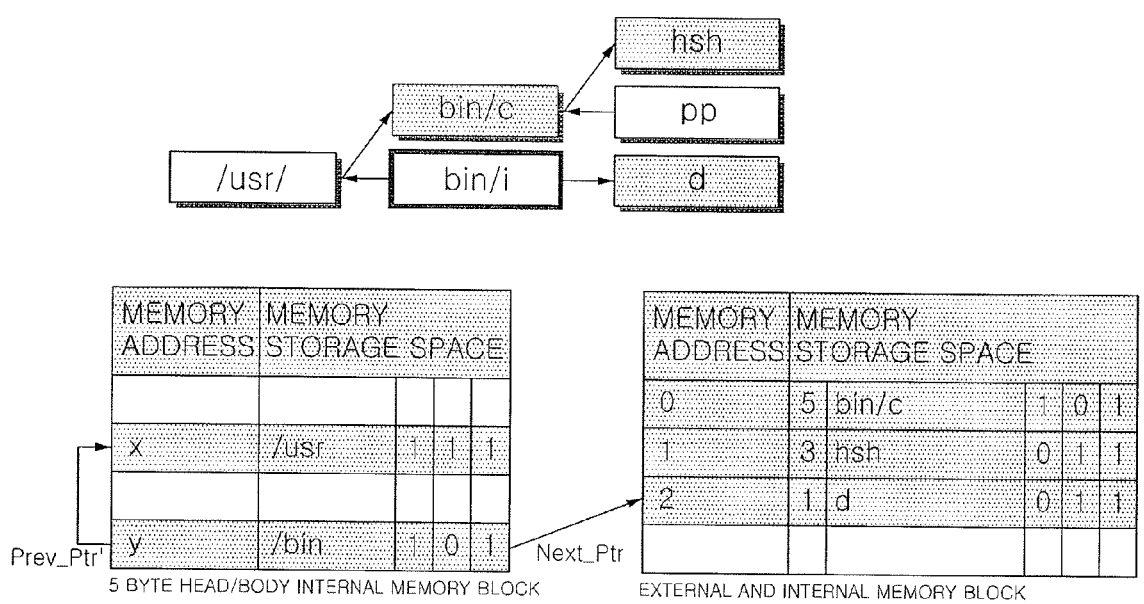

FIGS. 4, 5, and 6 illustrate examples of sequentially arranging and storing actual three signature string patterns in the internal memory blocks and the external memory blocks in the method of arranging the signature string patterns like in FIGS. 1, 2, and 3.

First, the first signature string pattern of FIG. 4 is divided into a "/usr/" token, a "bin/c" token, and a "hsh" token. The first token "/usr/" is provided in the memory address x of the internal memory block in accordance with a calculated hash value x. The character column "/usr" excluding the last character, the bit that represents whether the head token exists, a bit that represents whether the Next_Ptr exists, and a bit that represents whether the memory is assigned are set. Here, since the corresponding token is the head token, the Prev_Ptr is not provided and the Next_Ptr indicates the 0th address of the first of the external memory block.

Next, the token information "bin/c" is provided in the number 0 that is the external memory block address indicated by the first token. Here, the T_Size is filled with the basic value "5" and the bit that represents whether the Next_Ptr exists and the bit that represents whether the memory is assigned are set. Here, since the corresponding token is not the tail token, the bit that represents whether the tail token exists is not set and the Next_Ptr indicates the number 1 that is the second address of the external memory block.

Finally, the "hsh" token information is provided in the number 1 of the external memory block address indicated by the previous token. Here, the T_Size is filled with "3" that is the size of the corresponding token. The bit that represents whether the tail token exists and the bit that represents whether the memory is assigned are set. That is, the size of the token stored in the external memory block varies and the T_Size information is used for matching the same.

Next, the second signature string pattern of FIG. 5 is divided into the "/usr/" token, the "bin/c" token, and a "pp" token. Here, the "/usr/" token and the "bin/c" token share the same memory as the token of FIG. 4. Since the token next to the "bin/c" token exists, the "pp" token is provided in the tail internal memory block of 2 bytes. That is, the "pp" token is provided in the memory address y of the corresponding internal memory block in accordance with a calculated hash value y. A character column "p" excluding the last character and the bit that represents whether the memory is assigned are set. Here, the corresponding token is the value of the Prev_Ptr to indicate the number 0 address of the external memory block in which the "bin/c" token is stored.

That is, the tokens provided in all of the internal memory blocks have the Prev_Ptr value excluding the head token to have a connection to the previous token. In addition, the reason why the corresponding internal memory block does not have information on whether an additional tail token exists is because the tail memory block is provided by a size based on the hash based matching.

Finally, the second signature string pattern of FIG. 6 is divided into the "/usr/" token, the "bin/i" token, and a "d" token. Here, the "/usr/" token shares the same memory like in FIG. 5. Since the token next to the "/usr/" token exists, the "bin/i" token is provided in a head/body internal memory block of 5 bytes. That is, the bin/i token is provided in the memory address z of the corresponding internal memory block in accordance with a calculated hash value z. A character column "bin/" excluding the last character, the bit that represents whether the Next_Ptr exists, and the bit that represents whether the memory is assigned are set.

Here, since the corresponding token is not the head token, the value of the Prev_Ptr indicates the number x address of the internal memory block in which the "/usr/" token is stored. In addition, since the corresponding token is not the tail token, the Next_Ptr indicates the number 2 that is the second address of the external memory block.

Finally, the "d" token information is provided in the external memory block address number 2 indicated by a previous token. Here, the T_Size is filled with "1" that is the size of the corresponding token. The bit that represents whether the tail token exists and the bit that represents whether the memory is assigned are set. The above-described method of arranging and storing the signature string patterns can minimize the use of the hash based internal memory block without deteriorating the performance of the external memory block.

A method in which the signature pattern strings arranged and stored through the embodiments of FIGS. 1 to 6 are compared with the payload of introduction traffic and are searched will be schematically described as follows. First, the payload of the introduction traffic is shifted in units of bytes and is divided into character columns to be compared from 1 byte to 5 bytes every clock to be transmitted to matching engines, respectively.

First, a hash based internal memory block matching engine accesses the corresponding memory storage space of the address x of the internal memory block in accordance with a hash value for a comparison character column A to perform matching to the corresponding comparison character column A.

When it is determined by matching that the character columns are the same, it is determined whether the tail token exists. When it is determined by matching that the character columns are not the same, matching to the next character comparison column is repeated. Here, when the matched token information is the tail token, an alarm is generated. When the matched token information is not the tail token, the matched token information is used as the matching result of the previous character column when the matching to the next character comparison column is performed.

Next, the external memory block matching engine is driven when the Next_Ptr information is derived as a result of performing matching by the hash based internal memory block matching engine. That is, an access is made to the corresponding memory storage space of the external memory block using the Next_Ptr information obtained by previously performing matching and the matching to the comparison character column A is performed. When it is determined by the matching that the character columns are the same, it is determined whether the tail token exists. When it is determined by the matching that the character columns are not the same, the matching is stopped until the Next_Ptr information is provided in the hash based internal memory block matching engine. Here, when the matched token information is the tail token, the alarm is generated. When the matched token information is not the tail token, the matching is stopped.

As described above, basic pattern matching starts in the hash based internal memory block matching engine. However, a method of performing the external memory block matching engine in accordance with the matching result is used.

Figure 7:
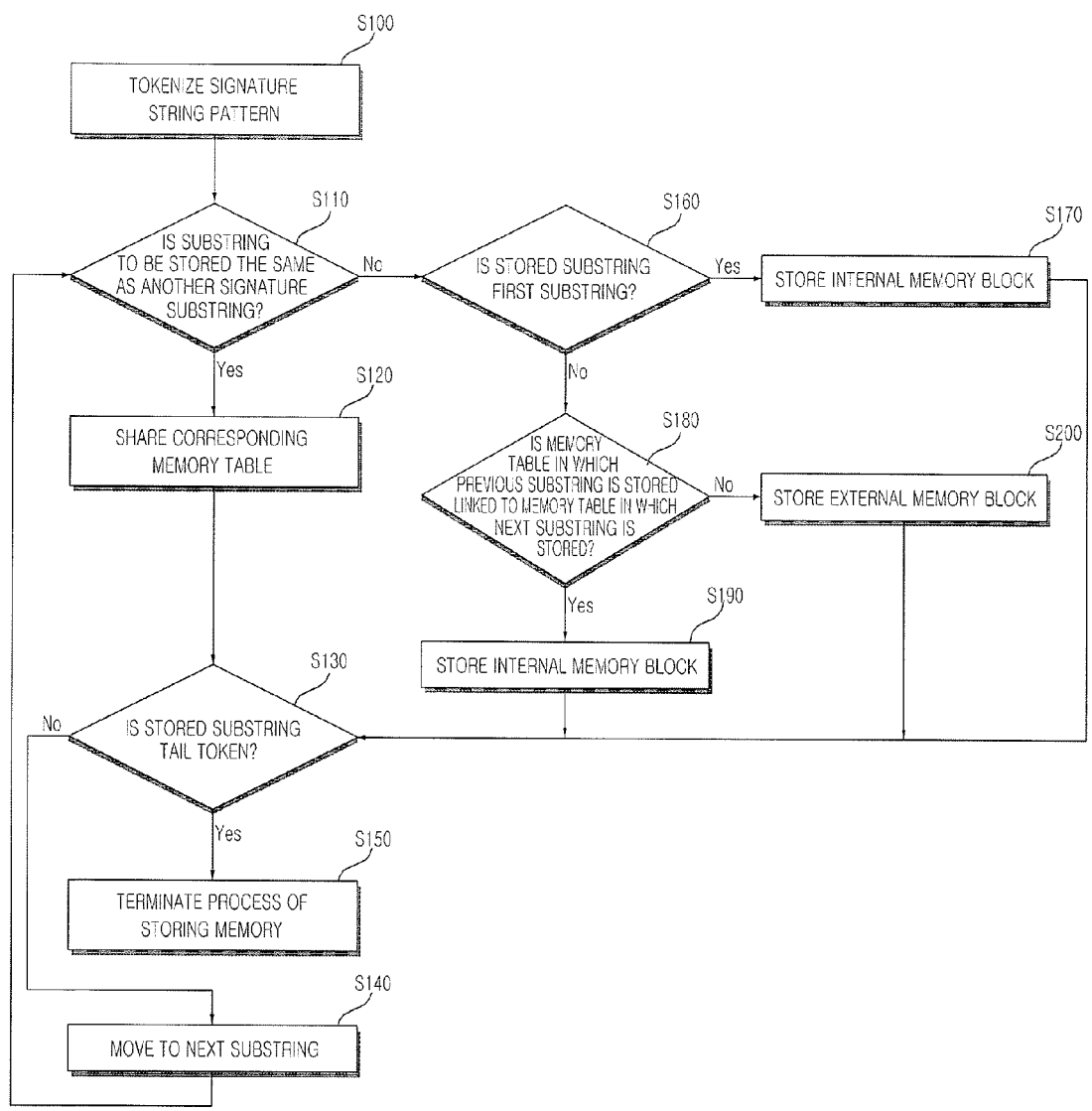
FIG. 7 illustrates the flow of a method of storing the signature string memory according to the present invention.

FIG. 7 illustrates the flow of processes of optimizing and storing the signature string patterns according to the present invention.

First, a signature string pattern to be stored in the memory is tokenized in units of substrings (S100) and it is determined whether the substring is identical with the substring in another signature string pattern previously stored in the memory (S110). When it is determined that the substring is identical with the substring in the other signature string pattern, it is not necessary to store the substring in the internal or external memory block by a memory table to share the corresponding memory table (S120).

In addition, it is determined that the substring to be stored in the memory is the tail token that exists in the last part of the signature string pattern (S130). When it is determined that the substring to be stored in the memory is not the tail token that exists in the last part of the signature string pattern, an access is made to the next substring (S140) to perform a process (S110) of determining whether the next substring is the same as the substring of another signature string pattern in the same position again.

On the other hand, when the substring to be stored in the step S110 is not the same as the substring of the other signature string pattern that exists in the same position, it is determined whether the substring to be stored is a first substring (S160). When it is determined that the substring to be stored is the first substring, the substring is stored in the internal memory block (S170).

However, when it is determined that the substring to be stored is not the first substring, it is determined whether the memory table in which the substring that exists before the substring to be stored is linked to the memory table in which the next substring is stored (S180).

When it is determined that the memory table in which the substring that exists before the substring to be stored is linked to the memory table in which the next substring is stored, the substring to be stored is stored in the internal memory block (S190). When it is determined that the memory table in which the substring that exists before the substring to be stored is not linked to the memory table in which the next substring is stored, the substring to be stored is stored in the external memory block (S200).

After the substring to be stored is stored in the internal memory block or the external memory block, a process of determining whether the stored substring is the tail token that is the substring provided in the last part of the signature (S130).

Figure 8:
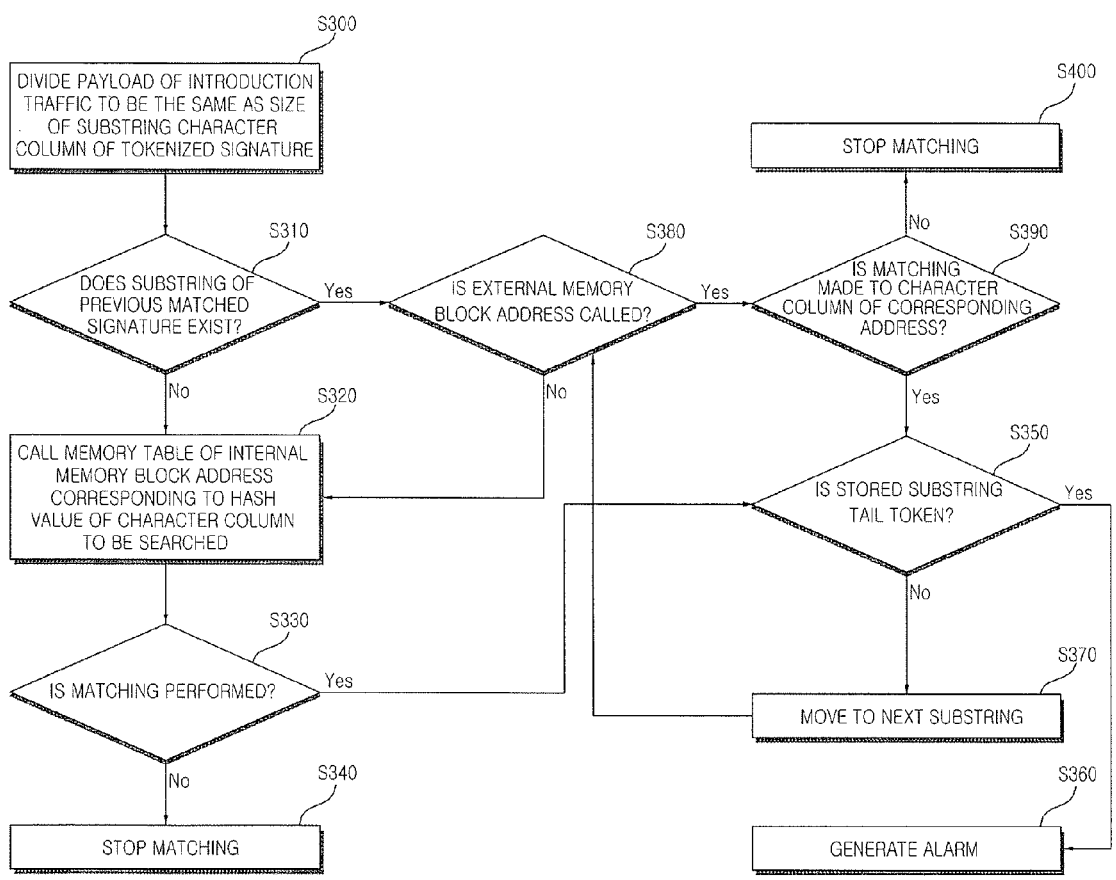
FIG. 8 illustrates a method of matching signature string patterns according to the present invention.

FIG. 8 is a flowchart illustrating a method of comparing, signature consisting of the substrings stored in the internal memory block or the external memory block with an introduction packet according to the present invention.

Before comparing the payload of the introduction traffic with the signature, the payload is divided to be the same as the size of the substring character column of the tokenized signature (S300). It is determined whether the token compared before the token to be compared is matched to the signature string pattern (S310). When it is determined that the token compared before the token to be compared is not matched to the signature string pattern, the memory table of the internal memory block address corresponding to the hash value of the character column of the token to be compared is called (S320). Then, it is determined whether the character column of the substring of the called memory table is matched to the character column of the token to be compared (S330).

When it is determined that the character column of the substring of the called memory table is not matched to the character column of the token to be compared, the matching is stopped. However, when it is determined that the character column of the substring of the called memory table is matched to the character column of the token to be compared, it is determined whether the token to be compared is matched to the tail token of the last part that constitutes the signature string pattern (S350). When it is determined that the token to be compared is matched to the tail token of the last part that constitutes the signature string pattern, an alarm informing that the signature is matched to introduction data is generated (S360). However, when it is determined that the token to be compared is not matched to the tail token of the last part that constitutes the signature string pattern, transition is made to the next character column of the token to be compared (S370). Before comparing the character columns, it is determined whether the external memory block address was called from the memory table of the substring to which the previous character column is matched (S380).

When it is determined that the external memory block address was called from the memory table of the substring to which the previous character column is matched, it is determined whether the character column of the called memory table is matched to the next token to be compared (S390). When it is determined that the character column of the called memory table is matched to the next token to be compared, a process of determining whether the substring compared with the matched token is the tail token that is the substring that exists in the last part of the signature string pattern (S350) is repeated.

When the character column of the called memory table is not matched to the next token to be compared, the matching is stopped (S400). On the other hand, when it is determined that the external memory block address was not called from the memory table in which the substring matched to the previous token is stored, a process of calling the memory table having the internal memory block address corresponding to the hash value of the character column included in the token to be searched (S320) is repeated.

The present invention can be realized in a computer readable recording medium as a computer readable code. The computer readable recording medium includes all kinds of recording apparatuses in which data that can be read by a computer system are stored. The computer readable recording medium includes a ROM, a RAM, a CD_ROM, a magnetic tape floppy disk, and an optical data storage apparatus and can be realized in the form of carrier wave (for example, transmission through the Internet). In addition, the computer readable recording medium is dispersed to the computer system connected on a network so that the computer readable code can be stored and executed by a dispersion method.

As described above, while the embodiments of the present invention have been described with reference to the accompanying drawings, these are merely illustrative, and those skilled in the art will understand that various modifications and equivalent other embodiments of the present invention are possible. Consequently, the true technical protective scope of the present invention must be determined based on the technical spirit of the appended claims.

According to the present invention, the maximal harmful traffic patterns are effectively arranged and stored in the limited hardware memory space. In order to perform search without deteriorating performance, the pattern memory optimizing method based on the string tokenizing and the high performance pattern matching method are provided. The searching patterns to be applied to the hardware memory are divided into the tokens of a uniform size and the tokens are properly arranged in the internal memory block and the external memory block so that the maximal searching patterns can be applied to the minimal memory region.

In addition, the hash based internal memory block matching engine and the external memory block matching engine performed by the result of the hash based internal memory block matching are provided so that it is possible to perform the pattern matching without deteriorating the performance due to the use of the external memory block. Therefore, according to the present invention, it is possible to effectively use limited hardware memory resources, to maximally store the searching patterns, and to search the patterns without deteriorating the performance.

What is claimed is:

1. A method of matching signature string patterns, comprising:
dividing a payload of introduction traffic into character columns, wherein the payload of introduction traffic is divided such that a character column to be searched is the same size as a signature substring character column of a signature string pattern that is tokenized into signature substrings, the signature string pattern being stored in a signature matching engine;
determining whether there exists a previous character column of the divided payload, which was compared to the signature string pattern before the character column to be searched, that was matched to a signature substring of the signature string pattern;
when the previous character column matching a signature substring of the signature string pattern does not exist, calling a memory table of an internal memory block address corresponding to a hash value of the character column to be searched;
determining whether the character column to be searched is matched to a signature substring stored in the called memory table;
stopping a matching process when the signature substring stored in the called memory table is not matched to the character column to be searched;
analyzing whether the signature substring is a last substring in the signature substrings of the signature string pattern when the signature substring stored in the called memory table is matched to the character column to be searched;
generating an alarm when the signature substring matched to the character column to be searched is the last substring of the signature string pattern; and
analyzing whether a next character column to be searched is matched to a substring stored in an external memory block address when the external memory block address is called from the called memory table and the signature substring matched to the character column to be searched is not the last substring of the signature substring pattern.

2. The method of claim 1, wherein, when the character column to be searched is not the last substring and the external memory block address is not called from the called memory table, further comprising analyzing whether a substring stored in a memory table of an internal memory block address corresponding to a hash value of the next character column to be searched is matched to the next character column.

3. The method of claim 1, wherein, when the previous character column was matched to a signature substring of the signiture string pattern, the method further comprising:
analyzing whether an external memory block address was called from a memory table in which the signature substring, which was matched to the previous character column, is stored; and
when the external memory block address is called from the memory table in which the signature substring matched to the previous character column is stored, analyzing whether a substring stored in the called external memory block address is matched to the character column to be searched, and
when the external memory block address was not called from the memory table in which the signature substring matched to the previous character column is stored, analyzing whether a substring stored in an internal memory block address corresponding to a character column hash value to be searched is matched to the character column to be searched.

4. The method of claim 3, wherein, when a substring stored in the internal or external memory block is not matched to the character column to be searched when analyzing whether a substring stored in the internal or external memory block is matched to the character column to be searched, a matching process is stopped, and
when a substring stored in the internal or external memory block is matched to the character column to be searched, analyzing whether the matched signature substring is the last substring in the corresponding signature substring.

5. A signature matching engine stored in units of substrings to which signature strings for distinguishing harmful packets included in introduction traffic are tokenized, comprising:
an internal memory block having a first memory table including a first substring included in both a first signature string and a second signature string, and having a memory table that includes a second substring from among substrings of the first signature string, wherein the second substring was stored in the internal memory block when the first memory table including the first substring was already linked to a memory table including another second substring from among substrings of the second signature string, and wherein the memory table that includes the second substring is linked to the first memory table; and an external memory block having stored therein a memory table that includes a substring from among substrings of a signature string, wherein the substring stored in the external memory was stored in the external memory when a substring previous to the substring stored in the external memory was not already linked to a memory table of another substring.

6. The signature matching engine of claim 5, wherein the memory table of the internal memory block comprises an address field of a memory table in which a previous substring is stored, an address field of a memory table in which a next substring is stored, a character column field of a substring to be stored, a field for displaying whether the next substring exists, a field for displaying whether the substring to be stored is a first substring, and a field for displaying whether a memory is assigned to the internal memory block.

7. The signature matching engine of claim 5, wherein the memory table of the external memory block comprises an address field of a memory table in which a next substring is stored, a character column field of a substring to be stored, a field for displaying information on the size of the character column of the substring to be stored, a field for displaying whether the next substring exists, a field for displaying whether the substring to be stored is the last substring, and a field for displaying whether a memory is assigned to the external memory block.

8. The signature matching engine of claim 5, wherein, when the memory table including the substrings is stored in the internal memory block, the memory table is provided in the address of the internal memory block matched to the hash value of the substring.

9. The signature matching engine of claim 8, wherein a character column of a predetermined size is stored in the substrings to be stored in the internal memory block memory table.

10. The signature matching engine of claim 5, wherein, when the memory table including the substrings is stored in the external memory block, the substrings are sequentially arranged from an arbitrary external memory block address.

11. A method of matching signature string patterns using the signature matching engine of claim 5, comprising:
dividing a payload of introduction traffic into character columns, wherein the payload of introduction traffic is divided such that a character column to be searched is the same size as signature substring character column of a signature string pattern that is tokenized into signature substrings, the signature substring character column being stored in the internal or the external memory block memory table;
determining whether there exists a previous character column of the divided payload, which was compared to the signature string pattern before the character column to be searched, that was matched to a signature substring of the signature string pattern;
when the previous character column matching a signature substring of the signature string pattern does not exist, calling a memory table of an internal memory block address corresponding to a hash value of the character column to be searched;
determining whether the character column to be searched is matched to a signature substring stored in the called memory table;
stopping a matching process when the signature substring stored in the called memory table is not matched to the character column to be searched;
analyzing whether the signature substring is a last substring in the signature substrings of the signature string pattern when the signature substring stored in the called memory table is matched to the character column to be searched;
generating an alarm when the signature substring matched to the character column to be searched is the last substring of the signature string pattern; and
analyzing whether a next character column to be searched is matched to a substring stored in an external memory block address when the external memory block address is called from the called memory table and the signature substring matched to the character column to be searched is not the last substring of the signature substring pattern.

12. The method of claim 11, wherein, when the character column to be searched is not the last substring and the external memory block address is not called from the called memory table, further comprising analyzing whether a substring stored in a memory table of an internal memory block address corresponding to a hash value of the next character column to be searched is matched to the next character column.

13. The method of claim 11, wherein, when the previous character column was matched to a signature substring of the signature string pattern, the method further comprising:
analyzing whether an external memory block address was called from a memory table in which the signature substring, which was matched to the previous character column, is stored; and
when the external memory block address is called from the memory table in which the signature substring matched to the previous character column is stored, analyzing whether a substring stored in the called external memory block address is matched to the character column to be searched, and
when the external memory block address was not called from the memory table in which the signature substring matched to the previous character column is stored, analyzing whether a substring stored in an internal memory block address corresponding to a character column hash value to be searched is matched to the character column to be searched.

14. The method of claim 13, wherein, when a substring stored in the internal or external memory block is not matched to the character column to be searched when analyzing whether a substring stored in the internal or external memory block is matched to the character column to be searched, a matching process is stopped, and
when a substring stored in the internal or external memory block is matched to the character column to be searched, analyzing whether the matched signature substring is the last substring in the corresponding signature substring.

* * * * *